(No Model.)
G. F. RICE.
ROLL FOR ROLLER SKATES.
No. 287,861. Patented Nov. 6, 1883.
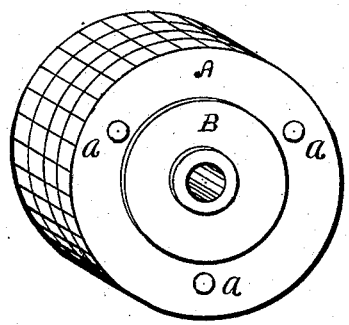
Fig. 1.
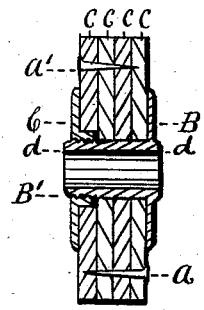
Fig. 2.
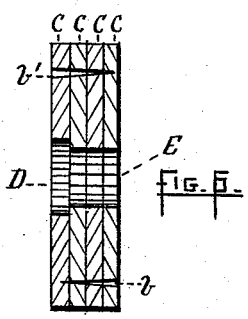
Fig. 6.
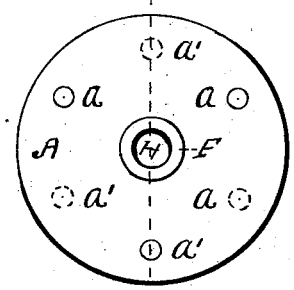
Fig. 3.
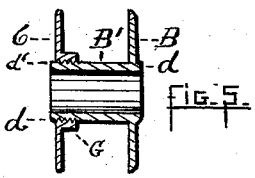
Fig. 5.
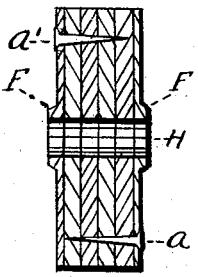
Fig. 7.
Fig. 4.
Witnesses:
R. B. Fowler.
H. M. Fowler.
Inventor:
Geo. F. Rice

UNITED STATES PATENT OFFICE.

GEORGE F. RICE, OF WORCESTER, MASSACHUSETTS.

ROLL FOR ROLLER-SKATES.

SPECIFICATION forming part of Letters Patent No. 287,861, dated November 6, 1883.

Application filed December 30, 1882. (No model.)

*To all whom it may concern:*

Be it known that I, GEORGE F. RICE, a citizen of the United States, residing at Worcester, in the county of Worcester and State of Massachusetts, have invented a new and useful Improvement in Rolls for Roller-Skates, Furniture-Casters, and other Similar Uses, of of which the following is a specification.

My invention relates to the construction of a roll of several disks of rawhide, to the method of making the same, and to a mode of attaching a metallic bushing to the same, and is illustrated in the accompanying drawings, in which—

Figure 1 is an isometrical view of my improved roll. Fig. 2 is a sectional view of the same, showing the metallic bushing. Fig. 3 is an end view of the roll. Fig. 4 is a sectional view of the roll when the metallic bushing is not used. Fig. 5 shows the metallic bushing; Fig. 6, the rawhide roll prepared to receive the bushing, and Fig. 7 shows one of the corrugated nails.

Similar letters refer to similar parts in the several views.

The method of making my improved roll is as follows: I first take several circular pieces or disks of rawhide somewhat larger than the desired roll, and, as rawhide is always more or less warped, I subject the disks separately to a pressure sufficient to take out the "warp." I then remove all the porous or "flesh side" of the hide by means of a revolving wheel or roll covered with sand-paper or emery. These circular pieces I then cement together with any suitable leather-cement, using as many pieces as necessary to form a roll of the desired thickness. I then bore the hole H through the center, and, placing the roll upon an arbor, turn the roll to the desired size and thickness. I then bore six holes nearly, but not quite, through the roll, to receive the nails $a\ a'$, each hole being considerably smaller than the nail to be inserted, three equidistant holes being bored from one end, as at $a\ a\ a$, and between these I bore three from the opposite end, $a'\ a'\ a'$, Fig. 3. The roll is then placed on end, and three of the nails $a\ a\ a$, having their points first inserted in the holes, may have a follower so arranged and operated by a hand-lever as to force all three of the nails into the roll simultaneously; or any known method of forcing in the nails may be used. The roll is then turned over and the three nails $a'\ a'\ a'$ forced in in the same manner.

The nails may be plain, as shown in Figs. 2 and 4; but I prefer to use nails having two opposite sides corrugated, as shown at $e\ e$, Fig. 7.

In case it is desirable, I turn the outside disks of rawhide so as to leave a boss, as at F F, Fig. 4.

Whenever a metallic bushing is desirable, I use a tube, B', long enough to reach entirely through the roll, and having the flange or head B at one end and a screw-thread, $d'$, Fig. 5, at the other, upon which is screwed the flange or head C, having a short tube, G, and an internal screw-thread fitting the end of the tube B'. A hole, E, is bored through the roll of a size to fit the tube B', and a recess or chamber, D, is made at one side to receive the short tube G. This bushing is inserted in the roll and the heads B and C are firmly drawn against the sides of the roll by means of the screw-thread, as shown in Fig. 2.

The above-described roll is specially adapted to be used in roller-skates, as the rawhide is stiff and unyielding, and runs over the surface of the floor with as little friction as rolls made of wood, and much easier than rolls of rubber or other similar elastic material, and, as it has no grain, rendering it liable to become checked or split, it is preferable to wood. It also entirely obviates the rattling noise attendant upon the use of wood rolls. My improved roll is also adapted to be used in furniture-casters and for many similar purposes, and such use comes within the scope and purpose of my invention.

I am aware that rolls for roller-skates have been heretofore used made of leather, rubber, or other elastic material, and I am also aware that rolls have been made with a metallic core or bushing passing through their center, and having flanges or disks attached thereto, and pressing against the sides of the roll; also, that rolls have been made with such a bushing or core and having a flange or disk attached to one end and a removable disk screwed upon the opposite end, so as to compress the roll. Such a construction is shown in Letters Patent No. 255,460, March 28, 1882.

I do not claim, broadly, the use of leather, rubber, or other elastic material forming the body of the roll; neither do I claim, broadly, the use of a metallic bushing or core; nor do I claim such a bushing or core with flanges or disks pressing against the sides of the roll, whether the same are attached to the central core or bushing by means of screw-threads or otherwise.

What I claim as my invention, and desire to secure by Letters Patent, is—

1. A wheel or roll for skates, consisting of disks of rawhide having the flesh side removed, and the several disks attached to each other by means of cement, as and for the purpose set forth.

2. A wheel or roll for skates, consisting of several circular disks of rawhide cemented together, and having nails $a$ and $a'$ forced in from each end, each nail being larger than the hole made to receive it, and the nails passing nearly but not quite through the several layers of rawhide, as and for the purpose set forth.

3. A wheel or roll for skates, consisting of several disks of rawhide cemented together, and having nails passing nearly through the same, the nails having the two opposite sides corrugated, as at $e\ e$, as and for the purpose set forth.

4. In a roll for roller-skates, the combination, with a metallic bushing or tube, B', having a head or flange, B, and screw-thread $d'$, and a nut formed of a short tube, G, with an internal screw-thread, and having a flange, C, at its outer end, of a roll bored to receive the tube B', and having a chamber, D, to receive the tube B', so as to allow an increase of the bearing of the nut on the screw $d'$ without increasing the thickness of the roll, as described, and for the purpose set forth.

5. The above-described process of making a rawhide wheel or roll for skates, consisting of preparing a series of disks by pressing out the warped surfaces and removing the flesh side, and cementing the several disks together, boring them through the center, and turning the roll on an arbor to the desired size and thickness, then forming a series of holes from each end partially through the roll and forcing into the holes nails somewhat larger than the holes, so the rawhide will press against the sides of the nail and hold them from being drawn out by the strain upon the rawhide disks, as and for the purpose set forth.

6. As an article of manufacture, a roll or wheel for roller-skates and other analogous uses, composed of several layers of rawhide, each having the flesh side removed, and all suitably and securely joined together, as and for the purpose set forth.

GEO. F. RICE.

Witnesses:
R. B. FOWLER,
H. M. FOWLER.